C. A. POTTER.
COURSE FINDER AND COURSE CONVERTER.
APPLICATION FILED FEB. 12, 1914.
1,108,517.
Patented Aug. 25, 1914.
2 SHEETS—SHEET 2.
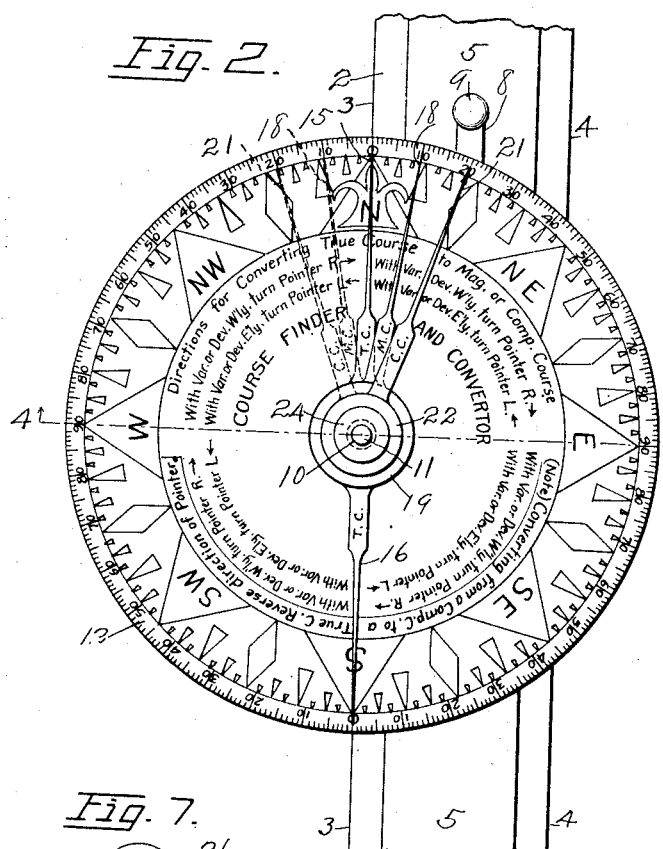
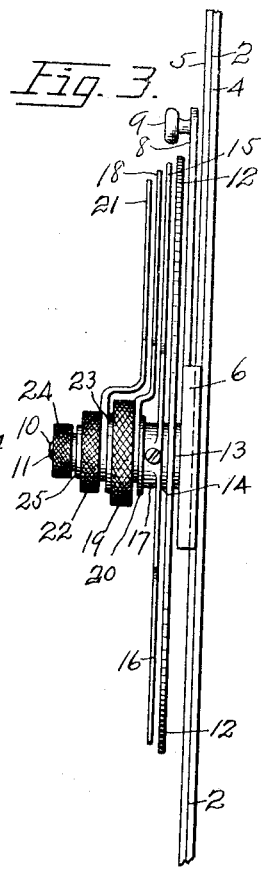
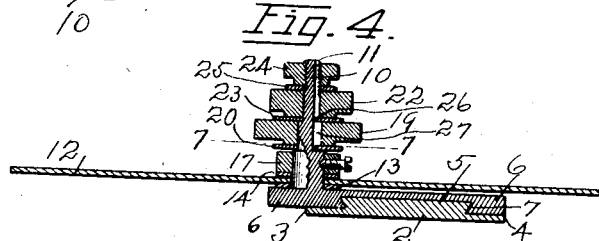
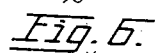
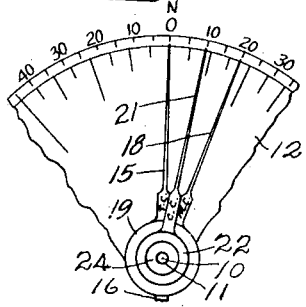
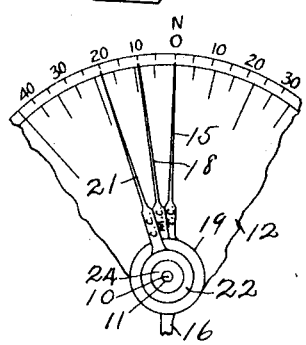
WITNESSES:
A. C. Thomas
George De Wallace
INVENTOR.
Chas. A. Potter
BY Harry De Wallace
ATTORNEY.

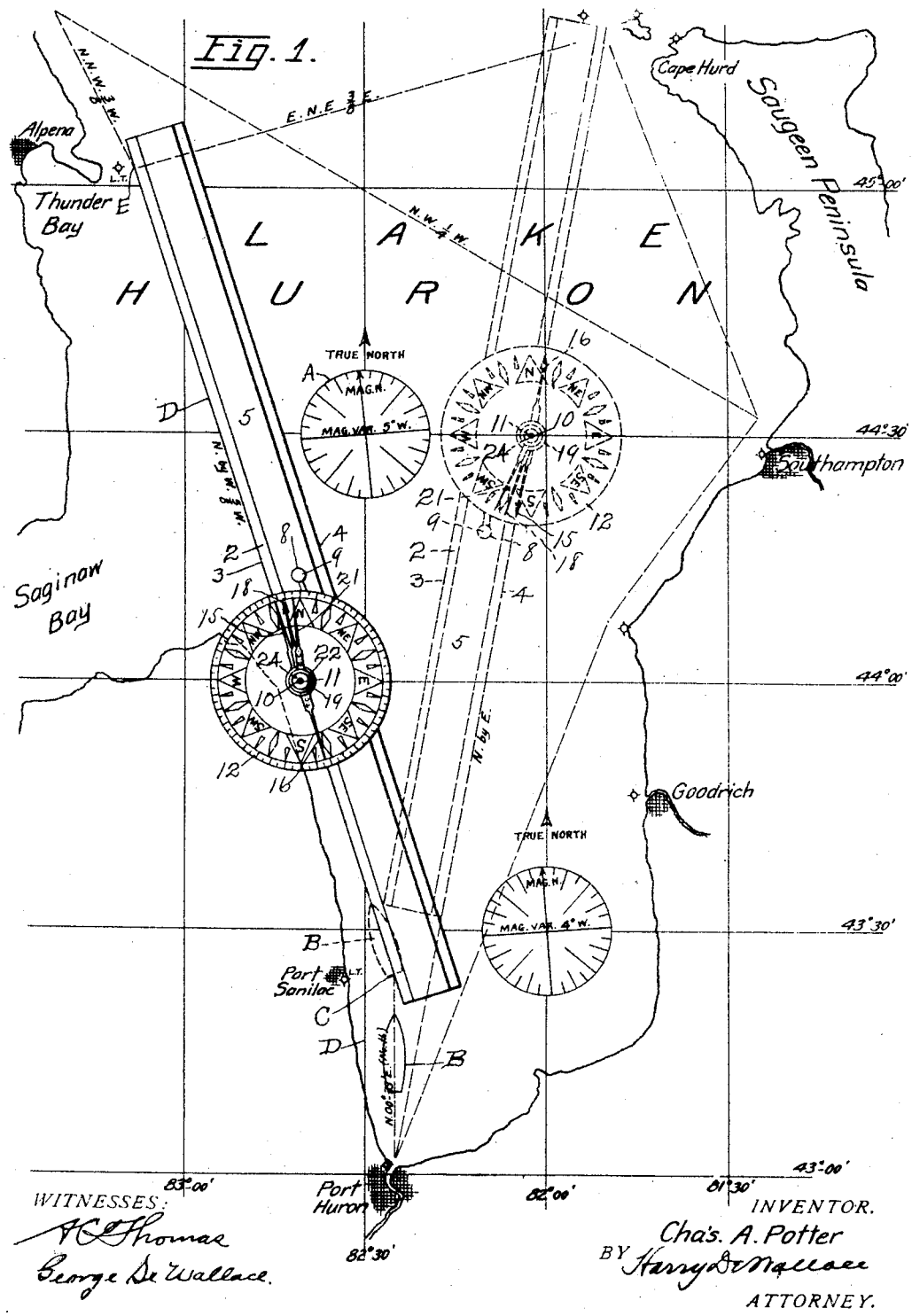

UNITED STATES PATENT OFFICE.

CHARLES A. POTTER, OF OSWEGO, NEW YORK.

COURSE-FINDER AND COURSE-CONVERTER.

1,108,517.   Specification of Letters Patent.   Patented Aug. 25, 1914.

Application filed February 12, 1914. Serial No. 818,393.

*To all whom it may concern:*

Be it known that I, CHARLES A. POTTER, a citizen of the United States, residing at Oswego, in the county of Oswego and State of New York, have invented certain new and useful Improvements in Course-Finders and Course-Converters, of which the following is a specification.

This invention relates to improvements in course finders and course converters for shaping a ship's course on a chart.

The object of the invention is to provide, simple and convenient device to be used in connection with navigation charts, for readily, quickly and accurately finding and shaping the true sailing course from one known point to another.

A further object is to provide means for readily and accurately converting a true course to a magnetic course or compass course. And a further object is to provide means for converting back from a compass course to a magnetic or the true course.

It is a particular object to provide an instrument by means of which a mariner may readily, quickly and accurately shape a ship's course on a chart without the necessity of making any calculations or measurements, other than adjusting and setting the several indicating parts.

I attain these objects by the means described in the annexed specification, and illustrated in the accompanying drawings, in which—

Figure 1 is a diagrammatic plan view of a lake-chart to which my invention is applied for finding a true sailing course. Fig. 2 is an enlarged plan view of the course finder; showing by full and dotted lines the manner of adjusting the pointers for indicating the westerly and easterly variation and also the deviation, of the compass. Fig. 3 is a side elevation of the same. Fig. 4 is a central cross section taken on line 4—4 of Fig. 1. Fig. 5 is a view; showing the adjustment of the pointers for converting a compass course to a true course when the variation and deviation are both westerly. Fig. 6 is a similar view; showing adjustment of pointers for converting from a compass course back to a true course when the variation is westerly and the deviation is easterly. Fig. 7 is a detail view of one of the washers which separate the several pointers.

The present invention is intended particularly for use in connection with lake and ocean navigation, for shaping a ship's course on a chart. The principal instruments used in navigation, are the chart, representing the whole or a part of a body of water the vessel is navigating; the mariners compass; the sextant, the lead, and the log. So far as navigation on the Great Lakes is concerned, all of these bodies of water are now charted, and on these charts, as a rule, the principal sailing courses are marked, and in addition to the lines indicating the courses or bearings, the true geographical directions are also noted, generally with reference to the four cardinal points of the compass. The ship's courses are usually marked on the charts in degrees reading easterly or westerly from the north and south points of the compass. The most important of the several instruments used by the mariner is the compass. This instrument is so well known that a particular description is not deemed necessary here.

The charts or maps used by the mariner are all laid out or arranged on geographical lines and measurements, and these, except in a very few instances, vary from what is known as the magnetic meridian or line, as determined from the direction the magnetic needle of the compass points. For this reason, the compass needle very seldom points to the true north. The angle that the magnetic meridian makes with the geographical or true meridian is called variation of the magnetic needle, or variation of the compass. Variation is either westerly or easterly according to the direction the magnetic needle is deflected from the true meridian, and the variation of the compass is different at different places on the earth's surface. As a rule the amount of variation is marked in degrees on the charts of the Great Lakes, and by examining the charts the mariner may readily ascertain the variation for any part of the sailing course.

Another serious difficulty mariners have to contend with is the disturbing influence of the magnetism of the ships due to the presence of iron and steel, which causes a deflection of the compass needle from the magnetic meridian. This is called deviation. Deviation varies on different ships, and it also varies on the same ship when the latter is headed in different directions. The deviation of the steering compass of each ship is generally recorded on a card, which the pilot or master keeps for reference. The deviation (particularly quadrantal) is practically the same in all latitudes, hence the card truly indicates the deflection or error wherever the ship may be.

For the purpose of illustrating the use of my invention, I have selected for, Fig. 1 of the drawing, a partial view of Lake Huron, which substantially follows one of the regular navigation charts of the said lake. In Fig. 1 the variation is all westerly, and it will be assumed that the deviation of the compass is also westerly, which means that the compass needle is deflected in both cases to the left side of the magnetic north, as shown at A in Fig. 1.

The detailed description of my course finder and course converter follows.

In the drawings, 2 represents the direction bar, which is preferably made of metal, from two to three feet in length. The under side of bar 2 is preferably flat and smooth, while its top side is rabbeted along its opposite edges 3 and 4, for providing a broad central longitudinal tongue or rib 5, the marginal edges of which are undercut like a dovetail.

6 represents a brass plate or part, the underside of which has a dovetail groove 7, which receives the tongue 5 of bar 2, upon which said plate is slidable, and 8 represents a handle-bar for manipulating the plate 6, one end of the handle 8 being secured to the plate 6, while the other end is fitted with a knob 9.

10 represents a post or standard which is mounted upon the topside of plate 6 near one side at right angles to said plate to which it may be rigidly secured in any suitable manner, the upper or free and 11 of said post being threaded. The post 10 is mounted on the plate 6 in such manner that its axis coincides exactly with the corresponding edge (either 3 or 4 as the case may be) of the direction bar 2.

12 represents a facsimile of the usual compass dial, such as is carried by the regular mariner's compass, which is used by the helmsman for steering a ship. The dial 12 is perforated centrally to receive the post 10, upon which it may be revolved for setting in different positions relatively to the edges 3 and 4 of the bar 2. The dial is held substantially free from the top side of the plate 6 by a thin washer 13.

14 represents a washer pierced by the post 10 which lies upon the dial 12.

15 and 16 represent similar pointers or needles, which extend in opposite directions diametrically and are preferably integral with a collar 17, which is applied concentrically to the post 10 just above the washer 14. The pointers 15 and 16 are fixed to the post 10 by a set-screw and they also coincide with the edge 3 of the bar 2, when the device is assembled, as shown by full lines in Fig. 1, and as shown in Fig. 2. The dotted lines in Fig. 1 show the fixed pointers 15 and 16 in coincidence with the edge 4 of the bar 2, as when the plate 5 is applied to the bar 2 in the reverse order, as compared with Fig. 2. The pointers 15 and 16 are marked with the letters T. C. indicating true course.

18 represents a single pointer, also marked M. C. indicating magnetic course, one end of which is secured to or is integral with a knurled collar 19 which is journaled on the post 10 above the collar 17, and from which it is separated by a washer 20. The pointer 18 is rotatable and may be set to indicate any point or degree on the dial relatively to the fixed pointers 15 and 16, for indicating the variation of the magnetic needle of the compass from the true meridian or course.

21 represents a second single pointer, which is preferably an integral part of a knurled collar or nut 22, also journaled on post 10, and separated from collar 19 by a washer 23, the pointer 21 is marked C. C. to indicate compass course. The several pointers and washers are held in place on the post 10, and are also subjected to suitable tension by a nut 24, which is screwed on to the threaded upper-end of the post 10, the said nut being separated from the collar 22 by a washer 25. The washers 14, 20 and 25 are held from rotation by means of tongues 26, which engage a longitudinal groove 27 in the post 10. By this arrangement either of the pointers 18 and 21 may be freely rotated without disturbing the other. And the dial 12 may also be rotated on the post 10 independently of all of the pointers.

In navigation, there are three kinds of courses: the compass course, the magnetic course, and the true course. If a ship is sailing where there is neither variation nor deviation, the true course is identical with the compass course. In order to sail a vessel over the shortest course between two points, it is necessary first to correct the true course for variation and deviation in order to find the compass course.

The operation of my course finder is as follows: Referring to Fig. 1, the ship B having left Port Huron, at the southern end of the lake, is headed due north, and is nearing the point C opposite Port Sanilac light, where the true course D changes. Before the ship reaches C, the pilot takes the course finder and lays the direction bar 2, with its edge 3 on the course D, setting the lower end at C while its upper end is brought to the point E, which is opposite Thunder Bay light, where the true course again changes. The course D leans toward the west in a substantially straight line, the markings of which may be taken as "N by W ⅝ W." The next step is to slide the compass disk 12 along the bar 2 until the north and south, or the east and west points on the dial coincide with either a meridian or a latitude parallel, as the course required may indicate. When the bar 2 is brought to the course-line D, the fixed pointers 15—16, which always coincide with the edge of the bar, will also point to and coincide with said true course. In the present illustration, the east and west points of the dial are placed on the parallel 44, which brings the north point or zero on the dial about 18° to the right of edge 3 of the direction bar 2. After the dial 12 has been set as described, the next step is to set the pointer 18 (magnetic pointer) to indicate the variation of the magnetic needle of the ship's compass for the latitude the vessel is sailing in, which according to the facsimile dial A (Fig. 1) shows "5° westerly variation." The magnetic pointer 18 is then swung around, by grasping the knurled collar 17, until its point indicates 5° easterly, or to the right, of the pointer 15. This will correct the magnetic variation, and indicate the magnetic course. The next step is to set the top pointer 21 for indicating the deviation of the ship's compass due to the presence of iron or steel in the hull. As explained, the deviation of one ship as compared with another varies, and also that the deviation of each ship varies according to which direction it is headed. It will be assumed that the deviation of the ship B when pointing northernly is 5° westerly. The pilot or mariner then swings the pointer 21 (C. C.) around until its point indicates 5° easterly or to the right of the pointer 18, this will then be the steering or compass course, which is approximately 10° easterly of the true course D with which the edge 3 of bar 2, and the stationary pointers 15 and 16 coincide. When the ship B arrives at the point C, the pilot will swing its head around until it points substantially north ⅝ west in agreement with the needle of the steering compass. By keeping the ship's head on the compass course indicated by the pointer 21, (see dotted lines B Fig. 1), the ship in sailing to the point E will traverse the shortest course. The dotted lines in Fig. 1, illustrate the use of the course finder when sailing substantially in the opposite direction.

In Fig. 2 is shown the course finder on an enlarged scale, in which the movable pointers 18 and 21 are set 10° apart for clearness. In this view the variation and deviation are both the same, and the pointers are set in accordance with the instructions printed on the dial 12 for indicating westerly variation as well as westerly deviation. The dotted lines in Fig. 2 show the manner of setting the pointers 18 and 21 to indicate easterly variation and deviation.

It sometimes happens that a vessel has been sailing on an unmarked course and it is desired to ascertain what both the magnetic and true course may be. To convert from compass course to either magnetic or true course, the direction bar 2 is placed so that the fixed pointers 15—16 and the corresponding edge (3 or 4) of said bar coincide with the compass course, which for example, according to Fig. 5, is north or zero. Let it be assumed that the variation and deviation are each westerly 10° corresponding to Fig. 2. The next step is to swing the pointer 18 (M. C.) to the left of the pointer 15 until it points to 10° for correcting for the deviation of the steering compass. This gives the magnetic variation of course. The next step is to swing the pointer 21 to the left until it points to 20°, which adds the variation of 10° westerly to the westerly deviation. The pointer 21 will then be pointing to, or indicate the true course, which is about N. by W. ¾ west.

To convert from the compass course to the magnetic or true course when the deviation is easterly and the variation is westerly; Fig. 6 illustrates the operation which is as follows: The fixed pointers 15 and 16 are set to point, for example due north and south, which brings pointer 15 to zero on the dial 12, which is assumed to be the compass course. The deviation of the ship's compass is, say, 20° easterly, the pointer 18 (M. C.) is next swung around to the right until it points to 20° east of north. This indicates the magnetic course, N. 20° east. The variation being 10° westerly, the pointer 21 (C. C.) is next swung around to the left of the pointer 18 until it points to N. 10° east. This gives the true course, which is about north ⅞ east, or nearly north by east.

In case a chart is not marked for indicating the true course, the mariner can shape the ship's course, or compass course, by applying the direction bar 2 to the points of departure and destination, and then manipulate the pointers 18 and 21 for correcting the variation and deviation.

It will be understood from the foregoing that an unskilled mariner by using my course finder and course converter, may readily shape the course of his ship by applying the device to the true course of a chart as shown in Fig. 1, and then, following the simple directions which are printed on the face of the dial 12 (see Fig. 2). He may also readily convert back from a compass course to a true course, or to a magnetic course, by applying and operating the device, as herein shown and described. In this way the various courses may be found, shaped or converted with substantial accuracy and the results may be obtained in a few minutes time.

Having thus described my invention, what I claim as new and desire to secure by Letters Patent, is—

1. A course finder, including a direction-bar, a plate slidable on said bar, said plate having a groove to receive the bar and having a post, a compass dial rotatable on said post above said plate, fixed pointers mounted on said post above said dial and coinciding with one edge of said bar, and a plurality of movable pointers journaled on said post above the fixed pointers adapted to be set in different positions relatively to the fixed pointers and also to each other.

2. A course finder, comprising a direction-bar, a plate slidable on said bar, said plate having a groove to receive said bar and having a post, a compass dial rotatable on said post, fixed pointers supported by said post above said dial, and a plurality of movable pointers journaled on said post above said fixed pointers, adapted to be set relatively to the edges of said bar and also to each other.

3. A course finder, including a direction-bar a plate slidable on said bar, said plate having a groove to receive said bar, and having a post whose axis coincides with one edge of said bar, a compass dial rotatable on said post and movable with said plate, fixed pointers secured to said post above said dial and coinciding with said edge of said bar, and a plurality of movable pointers pivoted on said post above the dial, adapted to be independently set for indicating different courses than said fixed pointers.

4. A course finder, including a direction-bar, a compass dial, a grooved plate slidable on said bar and having a post for pivotally supporting said dial, fixed pointers carried by said plate above said dial and coinciding with one edge thereof for indicating the true course on said dial, a movable pointer pivoted on said post above the fixed pointers adjustable for indicating the magnetic course, and a second movable pointer pivoted on said post above said first movable pointer adjustable for indicating the compass course.

5. A course finder and a course converter, including a direction-bar, adapted to be applied to a sailing course on a chart, a plate slidable on said bar, and having a post a compass dial rotatable on said post, the center of said dial coinciding with one edge of said bar, a pair of fixed pointers supported by said post above said dial and coinciding with the said edge of said bar, a movable pointer adapted to be manipulated for indicating the variation of a ship's compass, and a movable pointer adapted to be manipulated for indicating the deviation of a ship's compass.

6. A course finder and course converter, comprising a direction-bar capable of being applied to a true course on a chart, a pair of oppositely arranged fixed pointers adapted to coincide with the true course, a support for said pointers, said support slidable on said bar and having a post whose axis coincides with the edge of said bar, a compass-dial mounted concentrically on said post between said bar and said pointers, said dial rotatable for bringing its several points into correspondence with said fixed pointers, and a clamping device for holding said dial against rotation.

7. A course finder, comprising a direction bar, a pair of fixed pointers coinciding with one edge of said bar and spaced therefrom, a support for said fixed pointers slidable on said bar, a compass dial pivoted on said support between said bar and said fixed pointers, adapted to be rotated in opposite directions for successively bringing the points marked thereon into coincidence with the points of said pointers, movable pointers pivoted on said support adapted to be independently rotated and set in different positions relatively to said bar and said fixed pointers for indicating the variation and deviation of a ship's compass.

8. A course finder and a converter, including a direction bar, adapted to be applied to a true course on a chart, a plate slidable on said bar, said plate having a post whose axis coincides with one edge of said bar, a compass dial pivoted on said post, said dial rotatable for bringing its several diametric lines into coincidence with the edge of said bar, fixed pointers secured to said post above said dial, adapted to point to the opposed graduations of said dial, and also to coincide with the edge of said bar, a movable pointer pivoted on said post adapted to be set in different positions relatively to said fixed pointers for indicating the magnetic course, a movable pointer pivoted to said post adapted to be set in different positions relatively to said first movable pointer for indicating the compass course, and means for holding all of said movable parts in adjusted position.

In testimony whereof I affix my signature in presence of two witnesses.

CHARLES A. POTTER.

Witnesses:
CHARLES F. HAGER,
C. A. BENTLEY.

---

Copies of this patent may be obtained for five cents each, by addressing the "Commissioner of Patents Washington, D. C."